United States Patent [19]

Onishi

[11] Patent Number: 5,181,735
[45] Date of Patent: Jan. 26, 1993

[54] FOLDAWAY BABY CARRIAGE AND FOLDING MECHANISM EMPLOYED THEREIN

[75] Inventor: Ichiro Onishi, Osaka, Japan

[73] Assignee: Aprica Kassai Kabushikikaisha, Osaka, Japan

[21] Appl. No.: 815,261

[22] Filed: Dec. 27, 1991

[30] Foreign Application Priority Data

Jan. 11, 1991 [JP] Japan ............................ 3-2315

[51] Int. Cl.$^5$ ............................................. B62B 7/06
[52] U.S. Cl. ..................................... 280/642; 280/42; 280/650; 280/658
[58] Field of Search ............... 280/644, 642, 643, 658, 280/657, 650, 42, 647, 648, 39, 40, 43.1, 43.24

[56] References Cited

U.S. PATENT DOCUMENTS

| | | | |
|---|---|---|---|
| 4,317,581 | 3/1982 | Kassai | 280/644 |
| 4,362,315 | 12/1982 | Kassai | 280/644 |
| 4,565,388 | 1/1986 | Kassai | 280/650 |
| 4,610,460 | 9/1986 | Kassai | 280/642 |
| 5,127,662 | 7/1992 | Spak | 280/655 |

Primary Examiner—David M. Mitchell
Attorney, Agent, or Firm—W. G. Fasse

[57] ABSTRACT

In order to allow bending of members defining the cross-directional size of a frame of a foldaway baby carriage in association with movement of members forming side surfaces of the frame, side bars rotate with respect to front legs to draw up front leg sleeves through front leg rigid links. At this time, guide pins provided in the front legs are moved in spirally extending guide grooves which are formed in the front leg sleeves, so that the front leg sleeves rotate due to the spiral extension of the guide grooves. Thus, a front leg coupling link extending across the pair of front leg sleeves is bent about bend points. A similar structure is employed in relation to a rear leg coupling member extending across a pair of rear legs and a side bar coupling member extending across a pair of side bars.

6 Claims, 5 Drawing Sheets

FOLDAWAY BABY CARRIAGE AND FOLDING MECHANISM EMPLOYED THEREIN

BACKGROUND OF THE INVENTION

1. Field of the Invention

The present invention relates to a foldaway baby carriage and a folding mechanism employed therein, and more particularly, it relates to a foldaway baby carriage having a frame whose cross-directional size is defined by members which are bendable in association with an operation for folding members forming side surfaces of the frame, and a folding mechanism employed therein.

2. Description of the Background Art

U.S. Pat. No. 4,317,581 (issued on Mar. 2, 1982), granted to Kenzou Kassai, describes the basic structure of a foldaway baby carriage, which is of interest to the present invention. When the baby carriage disclosed in this patent is folded, its horizontal, vertical and cross-directional sizes are reduced as compared with an opened state, so that the baby carriage is easy to carry and store in the folded state.

However, the aforementioned foldaway baby carriage still has improvable points.

In particular, it is difficult to reduce the weight of this baby carriage, conceivably because of a relatively large number of components.

The baby carriage includes a large number of components, particularly because movement of members forming side surfaces of its frame must be interlocked with that of members defining the cross-directional size of the frame through a relatively complicated mechanism. Since planes of movement of the members forming the side surfaces of the frame are not identical nor parallel but perpendicular to those of movement of the members defining the cross-directional size of the frame, the mechanism for interlocking these members in operation must be capable of performing the so-called three-dimensional operation.

SUMMARY OF THE INVENTION

Accordingly, an object of the present invention is to provide a folding mechanism having a relatively simple structure which can interlock movement of members forming side surfaces of the frame of a baby carriage with that of members defining the cross-directional size of the frame, and a foldaway baby carriage employing such a folding mechanism.

The present invention provides a folding mechanism which is employed in a foldaway baby carriage comprising a horizontal pair of rod members and bendable coupling members extending across the pair of rod members, so that the coupling members are bent to approach the pair of rod members in a folding operation.

In order to solve the aforementioned technical problem, the inventive folding mechanism is characterized in the following structure:

Each of the coupling members comprises a pair of sleeves which are slidably mounted on the rod members to be rotatable about the central axes thereof, and a bendable coupling link coupling the pair of sleeves with each other. The sleeves are provided with spirally extending guide grooves, while the rod members are provided with guide pins which are received in the guide grooves. Each coupling member further comprises means for moving the sleeves longitudinally along the rod members.

The present invention also provides a foldaway baby carriage through the aforementioned folding mechanism.

The inventive foldaway baby carriage comprises members forming side surfaces of its frame and members extending across such members for defining the cross-directional size of the frame.

The members forming the side surfaces comprise:

a pair of horizontally extending handrail members, a pair of front legs having upper ends which are rotatably coupled to relatively front portions of the handrail members and lower ends which are connected with front wheels, a pair of rear legs having upper ends which are rotatably coupled to relatively front portions of the handrail members and lower ends which are connected with rear wheels, a pair of reversal members having first ends which are rotatably coupled to longitudinal centers of the pair of rear legs at first pivotal points, a pair of push rods, having lower ends which are rotatably coupled to second ends of the pair of reversal members whose positions being upwardly separated from the lower ends by prescribed distances are rotatably coupled to rear ends of the pair of handrail members, and a pair of side bars having front ends which are rotatably coupled to longitudinal centers of the pair of front legs at second pivotal points and rear ends which are rotatably coupled to the second ends of the pair of reversal members.

On the other hand, the members defining the cross-directional size of the frame comprise:

a front leg coupling member which extends across the pair of front legs in positions lower than the second pivotal points, and a rear leg coupling member which extends across the pair of rear legs in positions lower than the first pivotal points.

In such a foldaway baby carriage, the aforementioned folding mechanism is applied as follows:

The front leg coupling member comprises a pair of front leg sleeves which are slidably mounted on the front leg to be rotatable about the central axes thereof, and a bendable front leg coupling link coupling the pair of front leg sleeves with each other. The front leg sleeves are provided with spirally extending guide grooves, while the front legs are provided with guide pins which are received in the guide grooves.

The side bars are provided with side bar extension parts frontwardly extending beyond the second pivotal points, and the side bar extension parts are coupled with the front leg sleeves by front leg rigid links.

On the other hand, the rear leg coupling member comprises a pair of rear leg sleeves which are slidably mounted on the rear legs to be rotatable about the central axes thereof, and a bendable rear leg coupling link coupling the pair of rear leg sleeves with each other. The rear leg sleeves are provided with spirally extending guide grooves, while the rear legs are provided with guide pins which are received in the guide grooves respectively.

The reversal members are provided with reversal member extension parts extending toward the first ends beyond the first pivotal points, and these reversal member extension parts are coupled with the rear leg sleeves by rear leg rigid links.

When the sleeves are longitudinally moved along the rod members, the guide pins are moved in the spirally extending guide grooves, whereby the sleeves are provided with rotary motion. The coupling link is bent in response to such rotary motion of the sleeves. Thus, the pair of rod members are approached to each other.

The sleeves thus provide action for converting linear motion to rotary motion, which is employed for bending each of the front leg coupling link and the rear leg coupling link in the foldaway baby carriage according to the present invention. The side bars and the reversal members are driven to linearly move the sleeves through the front leg rigid links and the rear leg rigid links respectively.

Thus, the sleeves are linearly moved to rotate at the same time, whereby the inventive folding mechanism can be advantageously applied to portions, requiring the so-called three-dimensional movement, of a foldaway baby carriage.

When the aforementioned folding mechanism is employed for interlocking members forming side surfaces of the frame of a foldaway baby carriage with members defining the cross-directional size of the frame in movement, it is possible to fold the baby carriage by interlocking the former with the latter through a relatively simple mechanism. Thus, it is possible to reduce the number of components included in the foldaway baby carriage, thereby reducing the weight.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

FIGS. 1 to 6 are adapted to illustrate a foldaway baby carriage according to an embodiment of the present invention, which includes a folding mechanism characterizing the present invention. These figures show only the frame of the baby carriage, and a seat for a baby is omitted for facilitating easy understanding of the structure of such a frame. In general, the seat is provided with a seat portion and a backrest portion.

Figure 1:
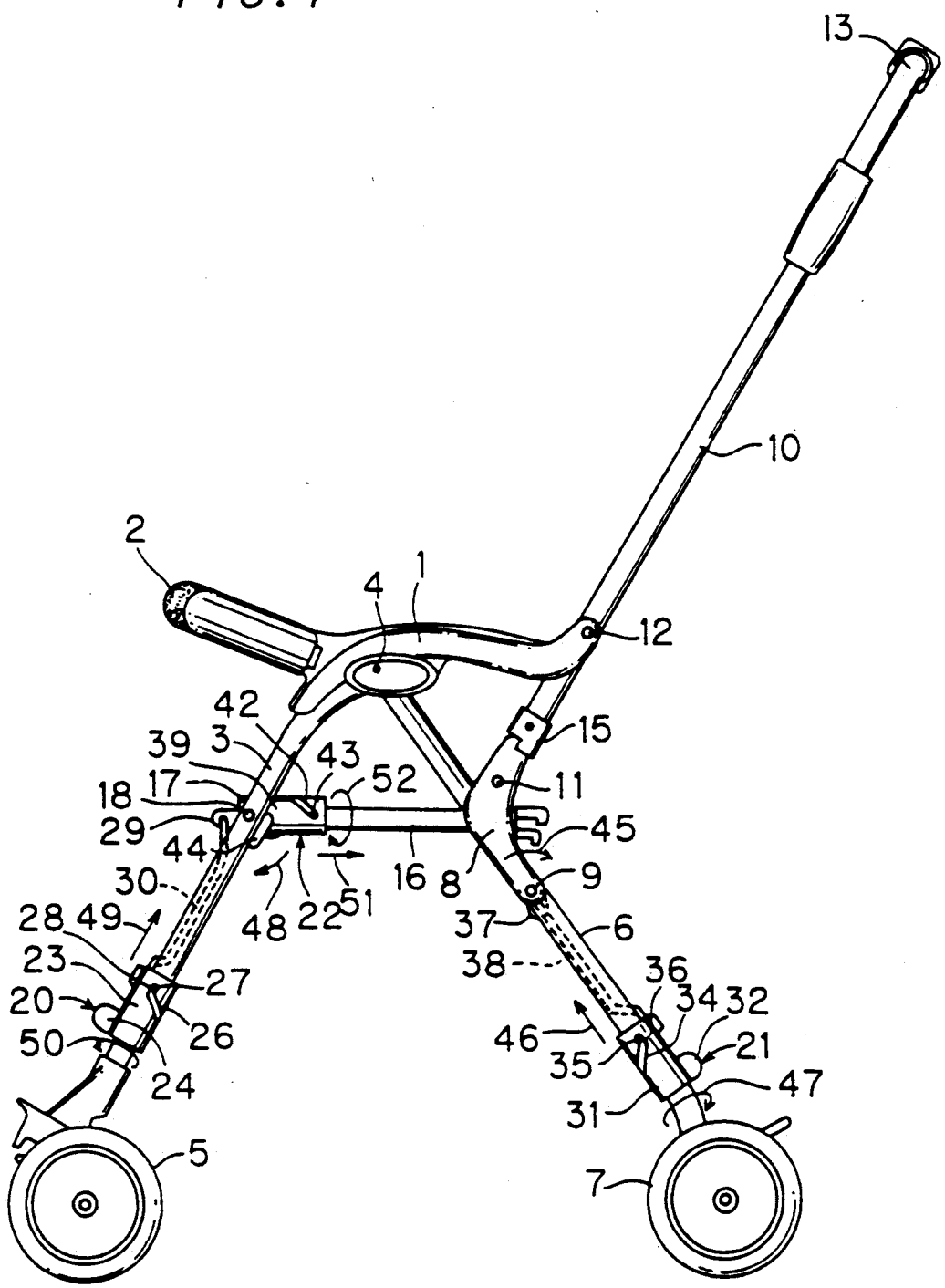
FIG. 1 is a right side elevational view showing an opened state of a foldaway baby carriage according to an embodiment of the present invention.
Figure 2:
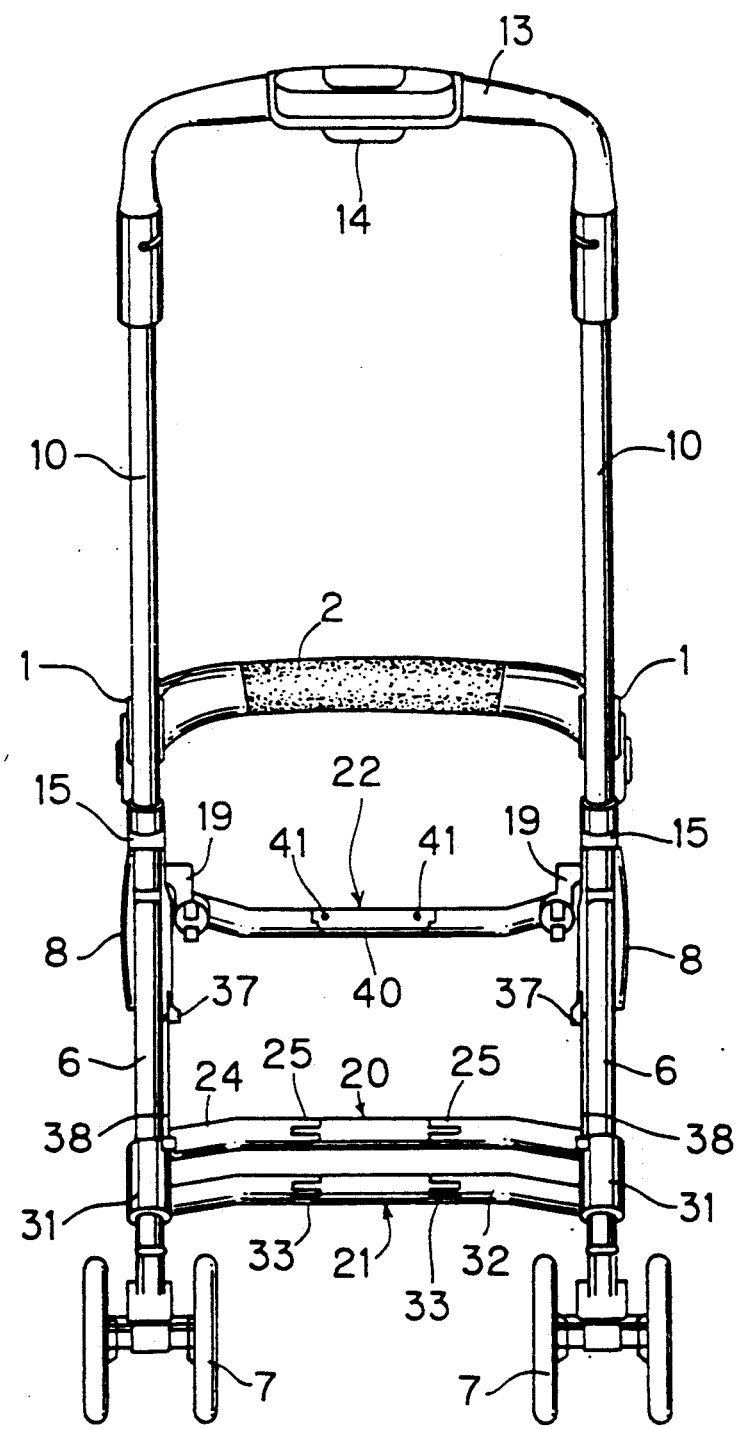
FIG. 2 is a rear elevational view of the baby carriage shown in FIG. 1.
Figure 3:
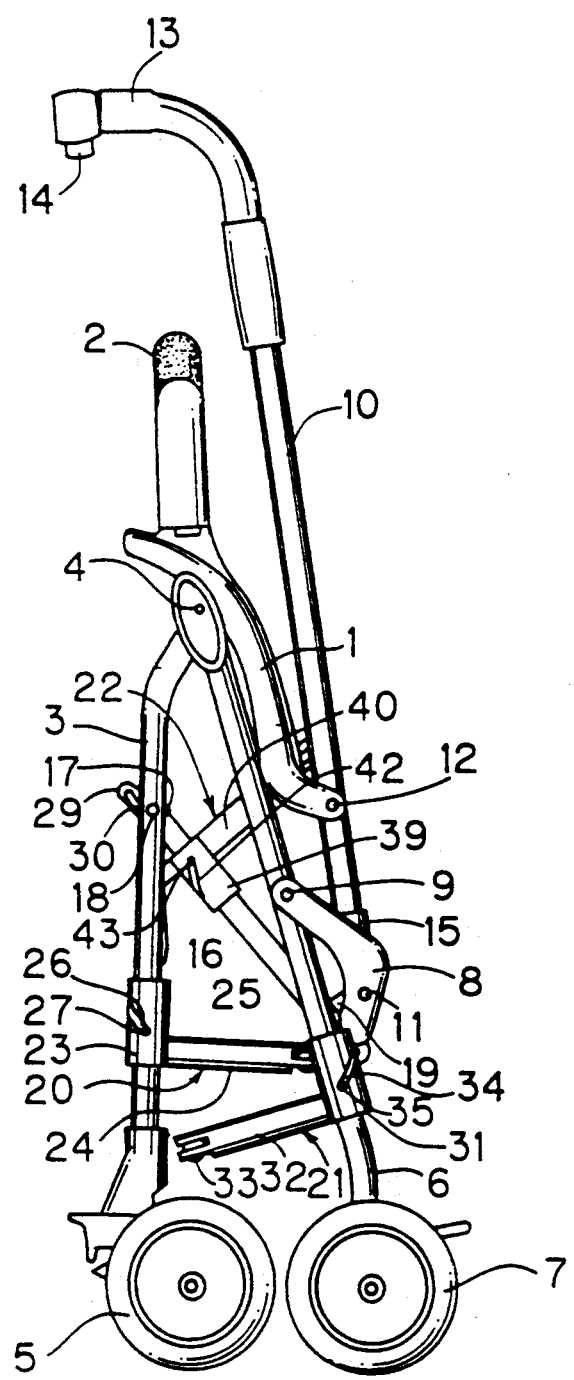
FIG. 3 is a right side elevational view showing a closed state of the baby carriage shown in FIG. 1.
Figure 4:
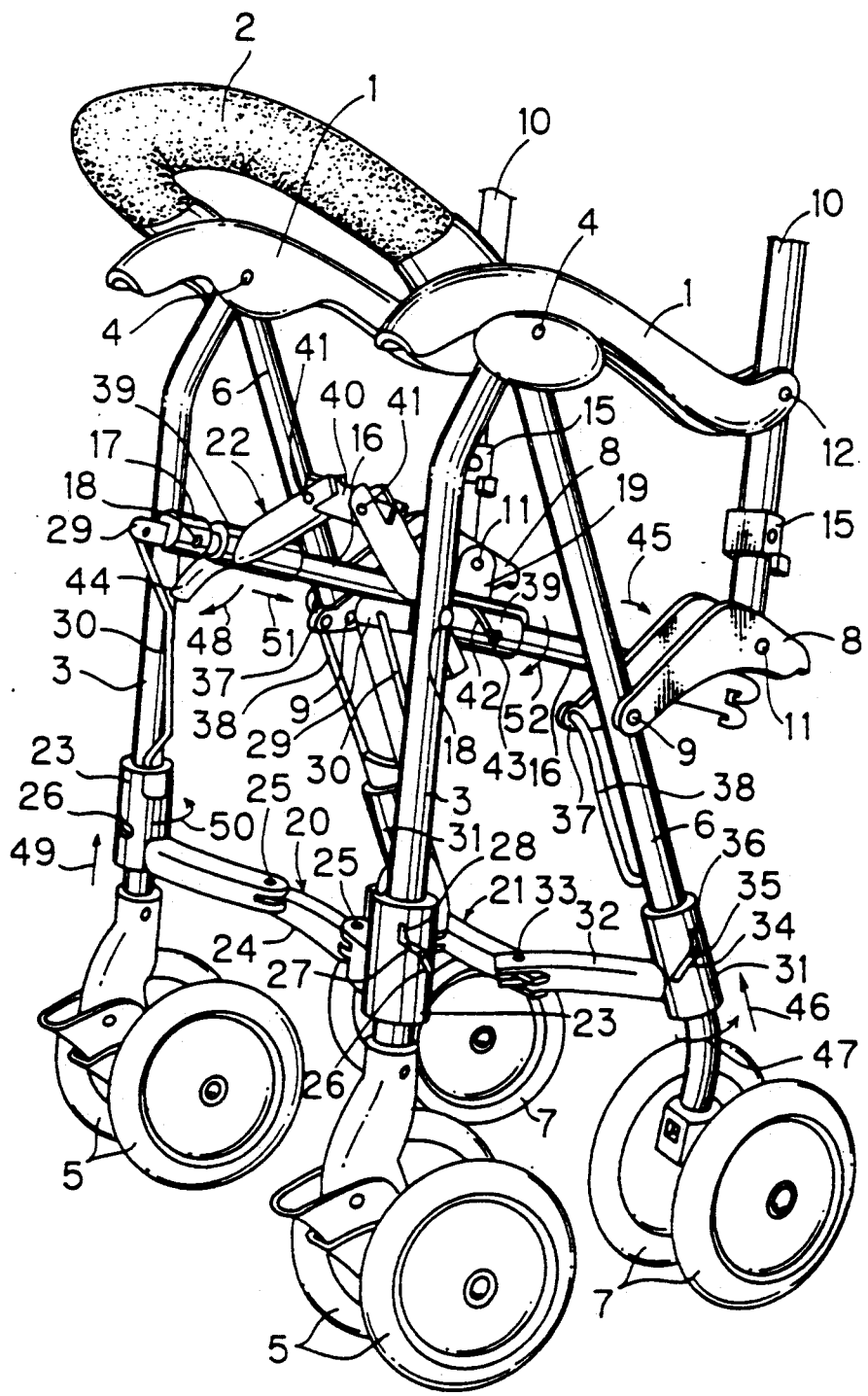
FIG. 4 is a perspective view showing an intermediate state of an operation for folding the baby carriage shown in FIG. 1.

FIG. 1 is a right side elevational view showing the baby carriage which is in an opened state, and FIG. 2 is a rear elevational view showing the baby carriage in the opened state. FIG. 3 is a right side elevational view showing the baby carriage which is in a closed state, and FIG. 4 is a perspective view showing a principal part of the baby carriage which is in an intermediate stage of a folding operation.

This foldaway baby carriage is generally provided with members forming side surfaces of its frame and members extending across the members forming the side surfaces for defining the cross-directional size of the frame. Further, this baby carriage has a laterally symmetrical structure. Therefore, elements which are included in and arranged on both sides of the inventive baby carriage are denoted by similar reference numerals.

The members forming the side surfaces of the frame include the following elements:

A pair of handrail members 1 are arranged to extend in the longitudinal direction. Forward ends of the pair of handrail members 1 are coupled with each other by a bendable body guard 2. This body guard 2 is preferably detachable from the handrail members 1.

Upper ends of a pair of front legs 3 are rotatably coupled to relatively front portions of the handrail members 1 by pivot pins 4. Front wheels 5 are mounted on lower ends of the front legs 3.

Further, upper ends of a pair of rear legs 6 are also rotatably coupled to the relatively front portions of the handrail members 1 by the pivot pins 4. While the front and rear legs 3 and 6 are rotatably coupled to the handrail members 1 by the common pivot pins 4 in this embodiment, such front and rear legs may alternatively be coupled to the handrail members 1 in a rotatable manner by pivot pins which are different from each other, in response to the design of the baby carriage. Rear wheels 7 are mounted on lower ends of the rear legs 6.

First ends of a pair of reversal members 8 are rotatably coupled to longitudinal centers of the pair of rear legs 6 through pivot pins 9. As clearly shown in FIG. 4, each of the reversal members 8 includes two plates, for holding each of the rear legs 6 therebetween.

Lower ends of a pair of push rods 10 are rotatably coupled to second ends of the pair of reversal members 8 by pivot pins 11. Each of these push rods 10 is also held between the two plates of each reversal member 8. Rear ends of the handrail members 1 are rotatably coupled by pivot pins 12 to positions of the push rods 10 which are upwardly separated from the lower ends by prescribed distances.

According to this embodiment, upper ends of the pair of push rods 10 are coupled with each other by a bendable push rod coupling member 13, which defines a handle grip for this baby carriage. An unlocking button 14 downwardly projects from the central portion of the push rod coupling member 13. The unlocking button 14 is pressed to release the baby carriage, which is locked in an opened or closed state. When the unlocking button 14 is pressed, the push rod coupling member 13 is rendered bendable and locking blocks 15, which are interlocked with the unlocking button 14 through wires (not shown), are upwardly moved along the push rods 10. Upon such upward movement, the locking blocks 15, which are regularly urged by springs (not shown) downwardly along the push rods 10, engage with the upper ends of the reversal members 8 to fix the push rods 10 and the reversal members 10 to each other and lock the baby carriage in an opened state. In a closed state of the baby carriage, on the other hand, the locking blocks 15 engage with longitudinal centers of the reversal members 8 as shown in FIG. 3, to fix the push rods 10 and the reversal members 8 to each other and lock the baby carriage in the closed state.

Front ends of a pair of side bars 16 are rotatably coupled to longitudinal centers of the pair of front legs 3. As clearly shown in FIG. 4, end pieces 17 are fixed to the front ends of the side bars 16, and pivot pins 18 pass through both the end pieces 17 and the front legs 3. Rear ends of the side bars 16 are rotatably coupled to end portions of the reversal members 8. According to this embodiment, the aforementioned pivot pins 11 for coupling the push rods 10 and the reversal members 8 are also employed for such coupling, while end pieces 19 are mounted on the rear ends of the side bars 16 in order to absorb difference between the vertical positions of the rear ends of the side bars 16 and the pivot pins 11. The pair of side bars 16 are adapted to hold the seat portion of the baby carriage.

On the other hand, the members defining the cross-directional size of the frame of this baby carriage includes the following elements:

A front leg coupling member 20 extends across the pair of front legs 3 in positions lower than the pivot pins 18.

A rear leg coupling member 21 extends across the pair of rear legs 6 in positions lower than the pivot pins 9.

According to this embodiment, further, a side bar coupling member 22 extends across relatively front portions of the pair of side bars 16.

The aforementioned push rod coupling member 13 can also be regarded as a member defining the cross-directional size of the frame.

As clearly shown in FIG. 4 in particular, the front leg coupling member 20 comprises a pair of front leg sleeves 23 which are slidably mounted on the front legs 3 to be rotatable about central axes thereof, and a bendable front leg coupling link 24 coupling the pair of front leg sleeves 23 with each other. According to this embodiment, the front leg coupling link 24 has two bend points 25, while both ends thereof are fixed to the front leg sleeves 23 respectively.

In this embodiment, the front leg sleeves 23 may be directly arranged on the front legs 3, which are formed by pipes having circular sections, so that the former are rotatable about central axes of the latter. A similar advantage can be attained as to the rear legs 6 and the side bars 16, which are formed by pipes having circular sections, as hereinafter described. The front legs 3 may not be entirely circular in section, but only portions provided with the front leg sleeves 23 may have circular sections. Alternatively, the front legs 3 may be provided thereon with separate members, whose outer peripheral surfaces are circular in section. This also applies to the rear legs 6 and the side bars 16, which are described later.

The front leg sleeves 23 are provided with spirally extending guide grooves 26. The front legs 3 are provided with guide pins 27, which are received in the guide grooves 26.

Figure 5:
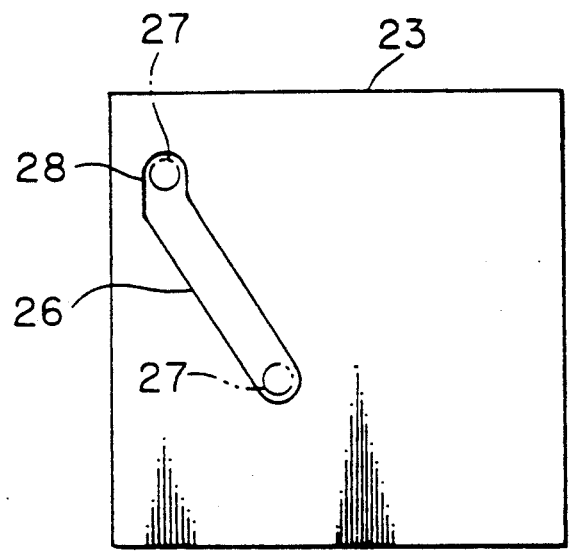
FIG. 5 is a developed elevational view showing a front leg sleeve 23.

FIG. 5 is a developed elevational view showing one of the front leg sleeves 23. As clearly shown in FIG. 5, a rotation inhibiting part 28, which extends in parallel with the axis of each front leg sleeve 23, is provided on one end of the guide groove 26.

The side bars 16 are provided with side bar extension parts 29 frontwardly extending beyond the pivot pins 18. According to this embodiment, the side bar extension parts 29 are integrated with the end pieces 17.

The side bar extension parts 29 are coupled with the front leg sleeves 23 by front leg rigid links 30 respectively. The front leg rigid links 30 are coupled with the front leg sleeves 23 preferably in a kind of universal joint manner, in order to allow rotation of the front leg sleeves 23.

A structure which is substantially identical to the aforementioned structure related to the front leg coupling member 20 is employed in the rear leg coupling member 21.

The rear leg coupling member 21 is provided with a pair of rear leg sleeves 31 which are slidably mounted on the rear legs 6 to be rotatable about central axes thereof, and a bendable rear leg coupling link 32 coupling the pair of rear leg sleeves 31 with each other. The rear leg coupling link 32 has two bend points 33, and both ends thereof are fixed to the rear leg sleeves 31 respectively.

The rear leg sleeves 31 are provided with spirally extending guide grooves 34. The rear legs 6 are provided with guide pins 35, which are received in the guide grooves 34.

The guide grooves 34 are provided in first ends with rotation inhibiting parts 36, similarly to the aforementioned guide grooves 26.

The reversal members 8 are provided with reversal member extension parts 37 endwardly extending beyond the pivot pins 9.

The reversal member extension parts 37 and the rear leg sleeves 31 are coupled with each other by rear leg rigid links 38 respectively. The rear leg rigid links 38 are coupled with the rear leg sleeves 31 preferably in a kind of universal joint manner, in order to allow rotation of the rear leg sleeves 31.

The side bar coupling member 22 comprises a pair of side bar sleeves 39 which are slidably mounted on the side bars 16 to be rotatable about central axes thereof, and a bendable side bar coupling link 40 coupling the pair of side bar sleeves 39 with each other. According to this embodiment, the side bar coupling link 40 has two bend points 41, and both ends thereof are fixed to the side bar sleeves 39 respectively.

The side bar sleeves 39 are provided with spirally extending guide grooves 42. The side bars 16 are provided with guide pins 43, which are received in the guide grooves 42 respectively.

Figure 6:
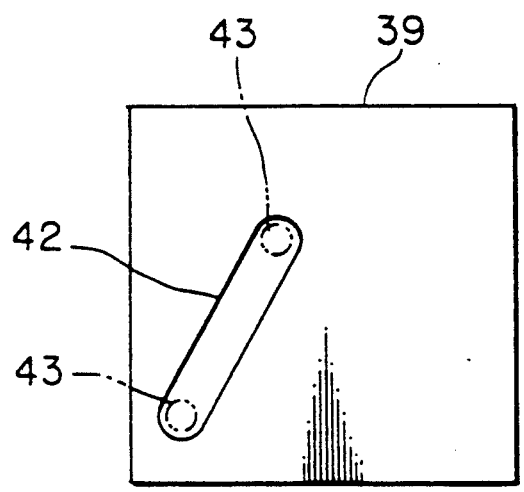
FIG. 6 is a developed elevational view showing a side bar sleeve 39.

FIG. 6 is a developed elevational view showing one of the side bar sleeves 39.

Each side bar sleeve 39 is provided with a sidewardly extending driving member 44. This driving member 44 comes into contact with each front leg 3 in an initial stage of an operation for closing the baby carriage which is in an opened state, so that each front leg 3 provides force for sliding each side bar sleeve 39 on each side bar 16.

The operation of the foldaway baby carriage, which has been described mainly with reference to the structure, is now described.

In an opened state of the baby carriage as shown in FIGS. 1 and 2, the reversal members 8 have rotated along the upper half portions of the rear legs 6, thereby bringing the push rods 10 into relatively upper positions in the members forming the side surfaces of the frame. In this state, the locking blocks 15 inhibit the push rods 10 and the reversal members 8 from relative movement, whereby the push rods 10, the reversal members 8, the handrail members 1 and the rear legs 6 define fixed triangles. The front legs 3, the rear legs 6 and the side bars 16 also define other triangles. Thus, the baby carriage is maintained in the opened state. On the other hand, the members defining the cross-directional size of the baby carriage are inhibited from movement in response to such fixation of the members forming the side surfaces. In particular, it is noted that the front leg sleeves 23 and the rear leg sleeves 31 are currently not rotatable about the central axes of the front legs 3 and the rear legs 6 respectively since the guide pins 27 and 35 are located in the rotation inhibiting parts 28 and 36 of the guide grooves 26 and 34 respectively. Thus, the front leg coupling link 24 and the rear leg coupling link 32 are strongly inhibited from bending.

In order to fold the foldaway baby carriage to bring the same from such an opened state into a closed state, the unlocking button 14 is first pressed to upwardly displace the locking blocks 15 along the push rods 10. Thus, the locking blocks 15 disengage from the reversal members 8.

Then, hands holding the push rod coupling members 13 are pulled back while pressing the unlocking button 14, to rearwardly incline the baby carriage and raise up the front wheels 5 while keeping the rear wheels 7 in contact with the ground. Thus, the push rod coupling member 13 is bent and the reversal members 8 rotate along arrow 45. In the state shown in FIG. 4, the reversal members 8 have rotated to some extent in the direction of the arrow 45.

Following such rotation of the reversal members 8, the rear leg rigid links 38, which are coupled with the reversal member extension parts 37, draw up the rear leg sleeves 31 along the rear legs 6 as shown by arrow 46. The guide pins 35 are moved in the guide grooves 34 in response to this, so that the rear leg sleeves 31 rotate along arrow 47 due to the spiral extension of the guide grooves 34. Thus, the rear leg coupling link 32 is bent about the bend points 33.

The aforementioned rotation of the reversal members 8 is also transmitted to the front legs 3 through the side bars 16, to draw the front legs 3 toward the rear legs 6.

At this time, the side bars 16 rotate along arrow 48 with respect to the front legs 3. Thus, the front leg rigid links 30, which are coupled with the side bar extension parts 29, draw up the front leg sleeves 23 along the front legs 3, as shown by arrow 49. The guide pins 27 are moved in the guide grooves 26 at this time, so that the front leg sleeves 23 rotate along arrow 50 due to the spiral extension of the guide grooves 26. Thus, the front leg coupling link 24 is bent about the bend points 25.

As the result of such rotation of the side bars 16, the front legs 3 provide the side bar sleeves 39 with force for sliding the same along the side bars 16 as shown by arrow 51. The guide pins 43 are moved in the guide grooves 42 at this time, so that the side bar sleeves 39 rotate along arrow 52 due to the spiral extension of the guide grooves 42. Thus, the side bar coupling link 40 is bent about the bend points 41.

The aforementioned operation further progresses to finally attain the closed state shown in FIG. 3. In this state, the locking blocks 15 again engage with other portions of the reversal members 8, thereby maintaining the baby carriage in the closed state. Since the front and rear wheels 5 and 7 are horizontally aligned with each other, the baby carriage is self-sustainable in such a closed state. As understood from the states of the push rod coupling member 13, the front leg coupling link 24, the rear leg coupling link 32 and the side bar coupling link 40 shown in FIG. 3, the baby carriage is so folded that the front wheels 5 and the rear wheels 7 are substantially in contact with each other as to the cross direction.

In order to open the baby carriage as shown in FIGS. 1 and 2 from the closed state shown in FIG. 3, the aforementioned steps are basically carried out in reverse order through the intermediate state shown in FIG. 4, similarly to the above.

While the present invention has been described with reference to the preferred embodiment, various modifications are available within the scope of the present invention. Therefore, the aforementioned embodiment includes elements other than those requisite for the present invention.

For example, the side bar sleeves 39 and the side bar coupling link 40 provided in relation to the side bar coupling member 22 may be omitted if a member corresponding to the side bar coupling member 22 is naturally bent upon mutual approximation of the pair of side bars 16.

Further, the side bar coupling member 22, which is adapted to reinforce the baby carriage in its opened state, may be omitted if such reinforcement is not necessary.

This also applies to the push rod coupling member 13. Namely, the push rod coupling member 13, which is adapted to reinforce the baby carriage in its opened state, may be omitted if such reinforcement is not necessary. If the baby carriage is reduced in strength in its opened state due to such omission of the push rod coupling member 13, another member may be employed for cross-directionally coupling other portions of the baby carriage with each other. For example, a member which cross-directionally extends in the backrest portion of the seat of the baby carriage may be employed for reinforcing the same in its opened state.

The aforementioned folding mechanism, which includes the coupling members 20, 21 and 22 having the sleeves 23, 31 and 39 and the coupling links 24, 32 and 40 with the guide grooves 26, 34 and 42 formed in the sleeves 23, 31 and 39 and the guide pins 27, 35 and 43 provided in rod or bar members such as the front legs 3, the rear legs 6 and the side bars 16, is also applicable to other portions of the foldaway baby carriage, or a foldaway baby carriage different from that shown in the drawings.

What is claimed is:

1. A foldaway baby carriage comprising members forming side surfaces of its frame and members extending across said members forming the side surfaces of said frame for defining the cross-directional size of said frame, wherein said members forming the side surfaces include:

a pair of horizontally extending handrail members;

a pair of front legs having upper ends being rotatably coupled to relatively front portions of said handrail members and lower ends being connected with front wheels;

a pair of rear legs having upper ends being rotatably coupled to relatively front portions of said handrail members and lower ends being connected with rear wheels;

a pair of reversal members having first ends being coupled to longitudinal centers of said pair of rear legs to be rotatable about first pivotal points;

a pair of push rods having lower ends being rotatably coupled to second ends of said pair of reversal members, positions of said pair of reversal members upwardly separated from said lower ends by prescribed distances being rotatably coupled to rear ends of said pair of handrail members; and a pair of side bars having front ends being coupled to longitudinal centers of said pair of front legs to be rotatable about second pivotal points and rear ends being rotatably coupled to second ends of said pair of reversal members, said members defining the cross-directional size of said frame include:

a front leg coupling member extending across said pair of front legs in positions lower than said second pivotal points, and a rear leg coupling member extending across said pair of rear legs in positions lower than said first pivotal points, said front leg coupling member includes:

a pair of front leg sleeves being slidably mounted on said front legs to be rotatable about central axes of said front legs respectively, and a bendable front leg coupling link coupling said pair of front leg sleeves with each other, said front leg sleeves are provided with spirally extending guide grooves respectively, said front legs are provided with guide pins being received in said guide grooves, said side bars are provided with side bar extension parts frontwardly extending beyond said second pivotal points respectively, said side bar extension parts and said front leg sleeves are coupled with each other by front leg rigid links respectively, said rear leg coupling member includes:

a pair of rear leg sleeves being slidably mounted on said rear legs to be rotatable about central axes of said rear legs respectively; and a bendable rear leg coupling link coupling said pair of rear leg sleeves with each other, said rear leg sleeves are provided with spirally extending guide grooves, said rear legs are provided with guide pins being received in said guide grooves respectively, said reversal members are provided with reversal member extension parts extending beyond said first pivotal points toward said first ends, and said reversal member extension parts and said rear leg sleeves are coupled with each other by rear leg rigid links respectively.

2. A foldaway baby carriage in accordance with claim 1, wherein said members defining the cross-directional size of said frame further include a side bar coupling member extending across said pair of side bars in positions behind said second pivotal points, said side bar coupling member includes a pair of side bar sleeves being slidably mounted on said side bars to be rotatable about central axes of said side bars respectively and a bendable side bar coupling link coupling said pair of side bar sleeves with each other, said side bar sleeves are provided with spirally extending guide grooves, said side bars are provided with guide pins being received in said guide grooves respectively, and said side bar sleeves are provided with driving members to be in contact with said front legs for providing force for sliding said side bar sleeves on said side bars from said front legs.

3. A foldaway baby carriage in accordance with claim 1, wherein parts being located in first ends of said guide grooves formed in said front leg sleeves for receiving said guide pins in an opened state of said baby carriage extend in parallel with the axes of said front leg sleeves.

4. A foldaway baby carriage in accordance with claim 1, wherein parts being located in first ends of said guide grooves formed in said rear leg sleeves for receiving said guide pins in an opened state of said baby carriage extend in parallel with the axes of said rear leg sleeves.

5. A foldaway baby carriage in accordance with claim 1, wherein said front legs and said rear legs are formed by pipes having circular sections respectively.

6. A folding mechanism employed in a foldaway baby carriage comprising a horizontal pair of rod members and a bendable coupling member extending across said pair of rod members so that said coupling member is bent and said pair of rod members are approached to each other in a folding operation, wherein said coupling member includes:

a pair of sleeves being slidably mounted on said rod members to be rotatable about central axes of said rod members respectively; and a bendable coupling link coupling said pair of sleeves with each other, said sleeves are provided with spirally extending guide grooves, said rod members are provided with guide pins being received in said guide grooves, and said folding mechanism further comprises means for moving said sleeves longitudinally along said rod members.

* * * * *